United States Patent
Zapf et al.

(10) Patent No.: US 11,889,914 B2
(45) Date of Patent: Feb. 6, 2024

(54) COLLAPSIBLE CONTAINER

(71) Applicant: GRUMAGO—Gruber Materials and Goods e.K., Nuremberg (DE)

(72) Inventors: Andreas Zapf, Bindlach (DE); Oliver Saiz, Nuremberg (DE); Mareike Roth, Nuremberg (DE)

(73) Assignee: GRUMAGO—GRUBER MATERIALS AND GOODS E.K., Nuremberg (DE)

( * ) Notice: Subject to any disclaimer, the term of this patent is extended or adjusted under 35 U.S.C. 154(b) by 270 days.

(21) Appl. No.: 17/616,531

(22) PCT Filed: Jun. 4, 2019

(86) PCT No.: PCT/EP2019/064490
§ 371 (c)(1),
(2) Date: Dec. 3, 2021

(87) PCT Pub. No.: WO2020/244744
PCT Pub. Date: Dec. 10, 2020

(65) Prior Publication Data
US 2022/0248832 A1    Aug. 11, 2022

(51) Int. Cl.
*B65D 6/16* (2006.01)
*A45F 3/20* (2006.01)
(Continued)

(52) U.S. Cl.
CPC .............. *A45F 3/20* (2013.01); *B65D 21/086* (2013.01); *B65D 43/022* (2013.01);
(Continued)

(58) Field of Classification Search
CPC ............... B65D 21/086; B65D 43/022; B65D 2543/0046; B65D 2543/00296;
(Continued)

(56) References Cited

U.S. PATENT DOCUMENTS

| | | | |
|---|---|---|---|
| 1,033,744 A | 7/1912 | Smith | |
| 4,930,644 A | 6/1990 | Robbins, III | |

(Continued)

FOREIGN PATENT DOCUMENTS

| | | |
|---|---|---|
| DE | 20 2017 000 238 U1 | 2/2017 |
| JP | H10-316126 A | 12/1998 |
| WO | 2015/023548 A1 | 2/2015 |

OTHER PUBLICATIONS

International Search Report and Written Opinion of the International Searching Authority for International Patent Application No. PCT/EP2019/064490 dated Jan. 28, 2020, 11 pages.

*Primary Examiner* — King M Chu
(74) *Attorney, Agent, or Firm* — Merchant & Gould P.C.

(57) ABSTRACT

A collapsible container, in particular a drinking cup, includes a cup-shaped element (2), made from a flexible deformable material, having a lower base part (3), a top part (4) with an opening (4) and side wall sections (5a, 5b, 5c, 5d) arranged therebetween. The side wall sections (5a, 5b, 5c, 5d) can be folded towards each other along fold lines (7, 8) formed into the material of the cup-shaped element (2). The cup-shaped element (2) can be folded together by twisting the base part (3) to the top part (4). The fold lines (7, 8) are oriented so that the cup-shaped element (2) constricts, as a result of torsion, between the base part (3) and the upper part (4) when twisting the base part (3).

18 Claims, 7 Drawing Sheets

(51) Int. Cl.
  *B65D 21/08* (2006.01)
  *B65D 43/02* (2006.01)
(52) U.S. Cl.
  CPC .............. *A45F 2003/205* (2013.01); *B65D 2543/00046* (2013.01); *B65D 2543/00296* (2013.01)
(58) Field of Classification Search
  CPC .......... B65D 2543/00518; B65D 2543/00583; B65D 2543/0092; B65D 2543/00546; B65D 1/0292; B65D 79/0084; A45C 7/0036; A45C 7/0031; A45C 7/0077; A45F 3/20; A45F 2003/205
  USPC .............................. 220/489, 666, 8; 215/900
  See application file for complete search history.

(56) References Cited

U.S. PATENT DOCUMENTS

| | | | |
|---|---|---|---|
| 5,960,983 | A | 10/1999 | Chan |
| 6,737,285 | B2 | 5/2004 | Iketani et al. |
| 8,556,099 | B2 * | 10/2013 | Perlman ............. B65D 11/1873 206/217 |
| 2011/0083262 | A1 * | 4/2011 | Barba ...................... A47K 3/06 4/585 |
| 2012/0216918 | A1 | 8/2012 | Tsuda et al. |
| 2013/0075393 | A1 * | 3/2013 | Haynie ................ B65D 1/0292 220/6 |
| 2016/0309930 | A1 * | 10/2016 | Stewart .................... A45F 3/20 |

* cited by examiner

COLLAPSIBLE CONTAINER

This application is a National Stage Application of PCT/EP2019/064490, filed 4 Jun. 2019, and which application is incorporated herein by reference. To the extent appropriate, a claim of priority is made to the above-disclosed application.

The present invention relates to a collapsible container, particularly a drinking container, according to the preamble of claim 1.

TECHNOLOGICAL BACKGROUND

Such containers are typically used to consume "to-go beverages." These are beverages, such as coffee, which are usually sold in disposable cups, wherein after consuming the beverage, the disposable cups end up as waste and must be disposed of. As people became more environmentally conscious, there was an increasing transition in the past to introduce reusable containers that consumers could take with them and use if needed.

However, this type of reusable container has certain requirements that must be met to ensure satisfactory usage. On the one hand, it is about the reusable container being reducible in its size, being closable after use to prevent unnecessary odors or leaking of residual liquids, being simple in its overall handling, and lastly the reusable container being easy to clean. In regard to reducing the size of the reusable container, so-called folding cups were also already proposed on various occasions in the past. However, it still remains a challenge to find reusable containers that meet all of the aforementioned requirements in a satisfactory manner.

PRIOR ART DOCUMENTS

A collapsible container according to the preamble of claim 1 is already known from WO 2015/023548 A1. The container comprises a cup-shaped element of a flexible, deformable material having a bottom-side base part, a top-side opening as well as a plurality of side wall sections arranged therebetween, which are in each case foldable from each other to each other by circularly circumferential fold lines. Thus, to collapse this known container, one must press the cup-shaped element from the bottom-side base section against the lid, by means of which folds of the multiple side wall sections are caused sequentially along the fold lines and the cup-shaped element can thus be housed within a top-side circumferential sleeve. To unfold this collapsed container, one must grip the bottom section of the collapsed cup-shaped element and pull it outward again by force. However, this requires a certain manual dexterity as well as finger strength, which users, particularly older users, do not always have. Since the fold lines inside the container run around the longitudinal axis of the container in a circular, ring-shaped manner, cleaning the inside of the container is also difficult and for this reason constitutes the risk that debris can accumulate specifically in these regions over time.

A collapsible, bottle-shaped container is known from US 2013/075393 A1, which has an upper part, a lower part, and located between them a flexible middle section consisting of silicone rubber. The container is collapsed by twisting the upper part to the lower part, wherein the flexible middle section constricts itself. So that the container has a certain sturdiness, the middle section must comprise a certain minimum material thickness.

U.S. Pat. No. 5,960,983 discloses a collapsible compost container having a flexible middle section of a thin-walled, flexible, film-like material, which is stabilized by a compressible basket consisting of individual wire springs.

U.S. Pat. No. 4,930,644 also discloses a container having a film-like exterior wall, whose sturdiness is ensured by a wire mesh provided in the outer region.

U.S. Pat. No. 6,737,285 B2 discloses a foldable drinking cup having a conic section-shaped, cup-like element, which is provided with creases running in a helical coil-shaped manner to make the pressing together of the cup-shaped element easier.

Lastly, DE 20 2017 000 238 U1 discloses a "coffee to go" container, whose flexible liner located between the upper part and lower part is collapsible in an accordion-like manner.

Problem Addressed by the Present Invention

The problem addressed by the present invention consists of providing a generic collapsible container that is simple to handle.

Solving the Problem

Appropriate embodiments of the invention are claimed in the additional claims.

Due to the fact that the cup-shaped element is collapsible by twisting the base part to so the top part, wherein the fold lines are oriented in such a manner that the cup-shaped element between the base part and the top part constricts itself by torsion while the base part is being twisted, to collapse the cup-shaped element, the latter does not have to be pushed against the lid; instead, it can be twisted in one direction. Accordingly, to initiate the unfolding process, the base part can be gripped and turned in the other direction. The turning to initiate the extension process is much simpler to carry out particularly by individuals having little finger dexterity or finger strength than pulling out the cup-shaped element designed as a one-piece molded part. In particular, it does not comprise any additional formed-in support parts made of another material.

Expediently, initial preferably straight fold lines are arranged running from the base part diagonally upward to the top-side opening. The folding or the constricting of the cup-shaped element is hereby made easier by twisting the base part in relation to the top part of said element. In addition, the fold lines can be cleaned more easily since they do not run perpendicular to the plane of the top-side opening, but at an angle to it. In particular, using a cleaning cloth, one can clean the interior of the cup-shaped element more easily by wiping along the fold lines there than was the case in prior art. In addition, the specially running fold lines collectively cause a longitudinal stiffening of the flexible, cup-shaped element in the unfolded state, which in turn results in one being able to reduce the wall thickness of said element compared to prior art. As an additional advantage, this in turn results in overall lower weight and a collapsing that is achieved more easily using less force.

Due to the fact that second fold lines are provided, which are arranged running from the base part at least at a smaller angle to the perpendicular than the first fold line or essentially perpendicular upward to the top-side opening preferably in a straight manner, the folding of the cup-shaped element by twisting the base part in relation to the top part of said element is made even easier.

Since the two fold lines are also oriented differently than the first folding lines, they also have a stiffening effect.

For practical purposes, the side wall sections adjacent to each of the first and second fold lines can be swiveled toward each other when collapsing the cup-shaped element. The folding process of the cup-shaped element is hereby further simplified.

The first and second fold lines have in the region of the base part, preferably above it, a common starting point or crossing point. In particular, the second fold line runs diagonally at an acute angle to the course of the first fold line.

It is particularly appropriate when the side wall sections adjacent to each of the first fold lines run inwardly when viewed from the periphery of the cup-shaped element and the side wall sections adjacent to each of the second fold lines run outwardly also when viewed from the circumference of the cup-shaped element. The opposite folding process or the constricting is hereby made easier.

Folding is further simplified when the wall thickness of the cup-shaped element is decreased in the region of the first and/or second fold lines compared to the wall thickness of the side wall sections.

Preferably, silicone rubber, silicone elastomer or a silicone elastic rubber product is provided as the material of the cup-shaped element. These materials are on the one hand extremely flexible and thus particularly well suited for the folding process; on the other, it also ensures the required hygiene standard.

Due to the fact that the cup-shaped element has in the region of its wall section a cylindrical segment positioned between two frustoconical-shaped segments, a holding ring, which
ensures thermal insulation, can be pushed on there in particular. Preferably an elastic rubber band can be provided as a holding ring. The holding ring is used both for thermal insulation of the cup-shaped element when grasped during use as well as for securing the housing components to each other when the container is in the folded state.

In the upper region of the container, the cup-shaped element is laterally surrounded by a sleeve. In particular, a lid can also be provided top-side on the sleeve.

Due to the fact that the top-side edge and/or a radially outwardly protruding collar of the cup-shaped element is secured in a clamping manner between the lid and sleeve, preferably without latching, the container can be completed or disassembled again in a simple manner.

The sleeve can hereby be preferably pushed on from the bottom side of the cup-shaped element on to the latter, by means of which simple assembly is ensured.

In particular, the sleeve may be designed in a frustoconical manner so that its shape accommodates the shape of the cup-shaped element.

For securing or sealing purposes, the collar can be clamped between the upper edge of the sleeve and the lower edge of a downwardly extending, circumferential outer ridge of the lid. An additional sealing of the interior of the cup-shaped element is hereby achieved.

The lid has an opening preferably arranged on the edge side, which can be closed by means of a slider, preferably a linear slider.

Furthermore, there may be arranged preferably on the lid or the sleeve an attachment eyelet that allows one to attach the container for example externally on clothing, on a backpack or a bag by means of a strap, a cord, a snap hook or some other securing means.

Preferably, the container is held together in the collapsed state by means of a preferably elastic holding ring that grasps vertically around the container. The holding ring can also be utilized in an in-use state as a thermally insulating holding sleeve that is pulled on to the element.

Due to the fact that in the unfolded state of the cup-shaped element, preferably on the interior of the cup-shaped element, third fold lines, formed into it as a tapering of the material, are arranged running from the base part diagonally, preferably straight, upward to the top-side opening, the folding process is simplified even more. The material of the cup-shaped element can fold inward somewhat around these third fold lines during the screwing down process. The constricting is hereby further simplified so and the effort required is also further reduced.

Furthermore, in the unfolded state of the cup-shaped element, in the upper region of the latter, preferably on the inside of the cup-shaped element, a fourth fold line formed into it is arranged running in a radially circumferential manner. The height of the folded region of the cup-shaped element can be further reduced at the end of the screwing-down process by a folding over about this circumferential fourth fold line.

The first, second, third and/or fourth fold lines are in each case bending grooves, which are formed into the material and have a material thickness of 55 to 75% of the material thickness of the adjacent material in the side region of the cup-shaped element.

The material thickness of the cup-shaped element in its folding region adjacent to the fold lines, i.e., in its non-weakened side region between the top part and the base part, lies preferably in a range of 1.00 mm to 1.6 mm.

In addition, the slider may be provided with a vent opening, which is flush with a vent opening on the lid when the slider is open, so that when the edge-side opening (drinking opening) is open while drinking, pressure compensation can occur.

The region of the edge-side opening and/or the region of the vent opening of the lid can be sealed in each case in a closed state by in each case a soft material component region injection-molded on the slider for example, which presses against the lid in the region of the edge-side opening and/or in the region of the vent opening or vice versa.

DESCRIPTION OF THE INVENTION BY MEANS OF AN EMBODIMENT

A suitable design of the present invention is explained in greater detail by means of an embodiment. Recurring features are only described once for clarity's sake. In the drawings:

FIG. 4 depicts an exploded view of the individual parts of the container according to

FIG. 1;

Figure 1:
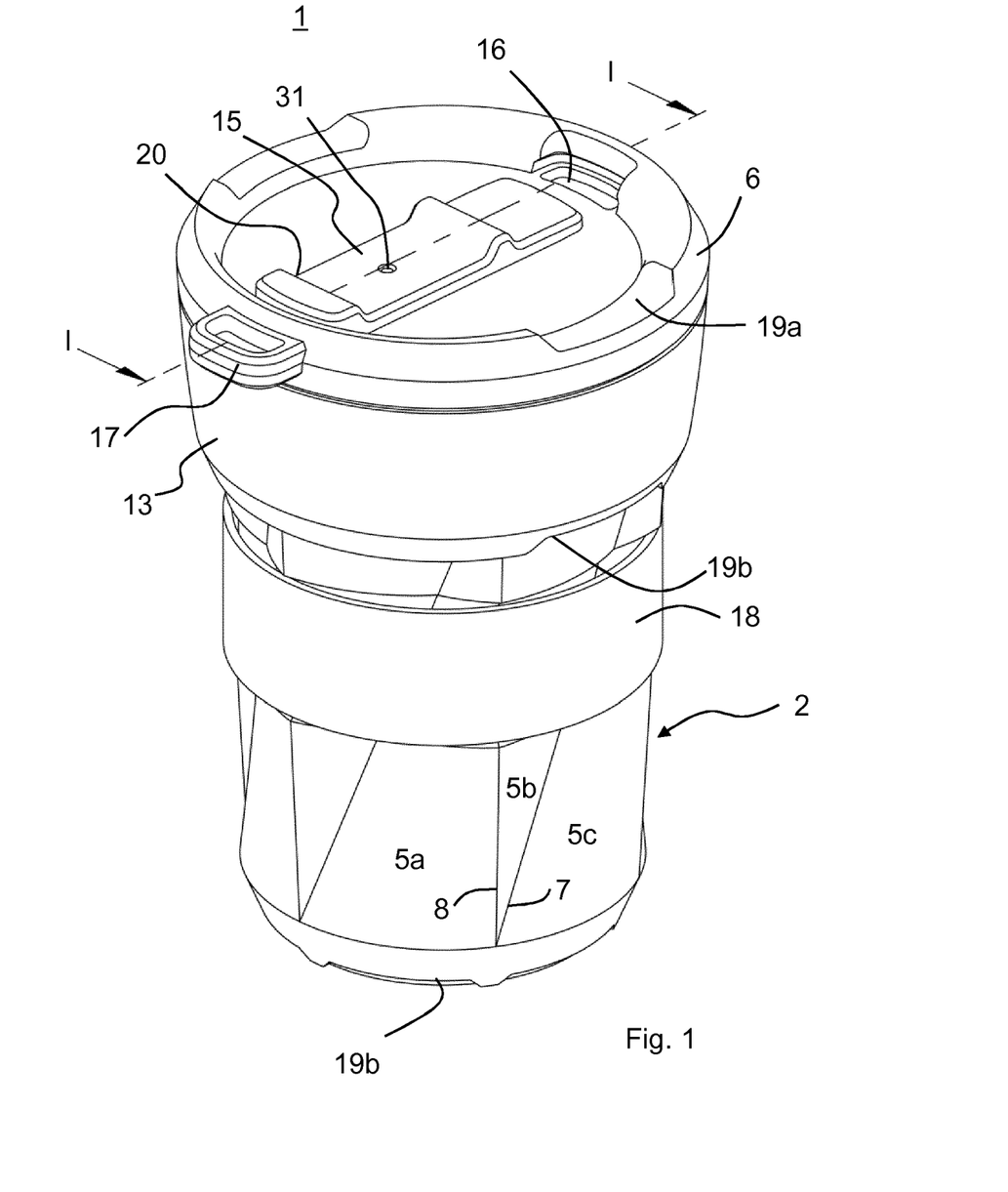
FIG. 1 depicts a perspective view of a design of the container according to the invention in a state when used.

Reference number 1 in FIG. 1 depicts an appropriate design of the foldable container according to the invention, e.g., a drinking cup, in an in-use state. The container 1 comprises a lid 6 having an edge-side opening 16, which can be closed if necessary by means of a linearly movable slider 15 attached to the lid 6. An attachment eyelet 7 is provided on the lid 6 in a laterally projecting manner.

On the bottom side of the lid 6, there is connected a ring-like, e.g., frustoconical, sleeve 13, which together with the lid 6 forms the top-side region of the container 1 in the in-use state. Protruding from the bottom side of sleeve 13 is a cup-shaped element 2, on whose exterior side a circumferential holding ring 18 is located. The holding ring 18 serves on the one hand as a holding surface, and on the other as thermal insulation against a hot liquid present inside the container 1. On the top side of the lid 6 and on the bottom side of the sleeve 13, there are provided opposing recesses 19a and 19b, respectively, whose significance will be explained in greater below. The top side of the slider 15 is also provided with a recess 20. In addition, the slider 15 is provided with a vent opening 31, which when the slider 15 is open, is flush with a vent opening 32, located beneath it (visible in FIG. 6), on the lid 6 so that when the slider 15 is open or edge-side opening 16 is open, pressure compensation can occur while drinking.

The region of the edge-side opening 16 and/or the region of the vent opening 32 of the lid can be sealed in each case by a soft-material component region (not depicted in the drawings) injection-molded on to the slider 15 for example, which, in the region of the edge-side opening 16 and/or in the region of the vent opening 32, presses against the lid 6 or vice versa.

Figure 2:
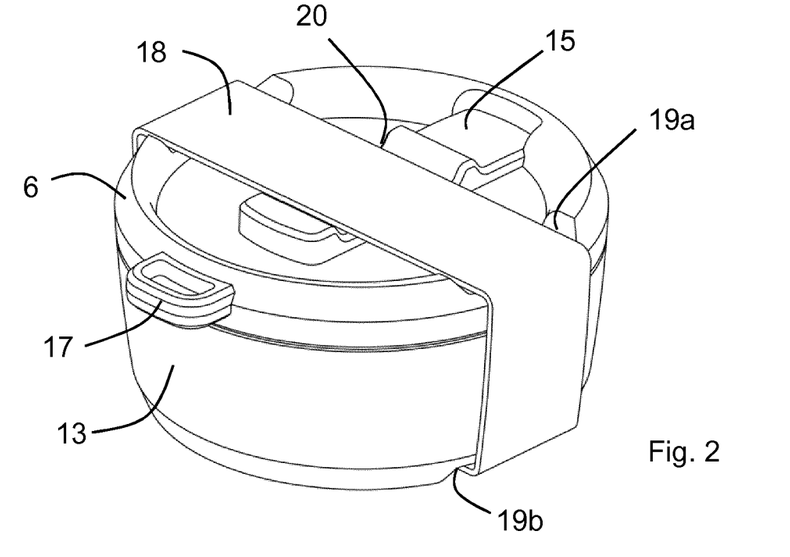
FIG. 2 depicts a perspective view of the container according to FIG. 1 in a collapsed, secured state.

If the container is not being used, but is only being carried along, it is in a collapsed and secured state, as can be seen in FIG. 2. In this state, the cup-shaped element 2 is housed in a collapsed manner inside the holding ring 18. For security purposes, the holding ring 18 encloses in a vertical orientation the arrangement of the lid 6, the sleeve 13 as well as the base part 3 of the cup-shaped element 2. To this end, the holding ring 18 is formed of an elastic material. For example, it may be a rubber band. The recesses 19a, 19b as well as 20 are dimensioned in such a manner that the holding ring 18 is secured in its position by the respective recesses 19a, 19b and 20.

Figure 3:
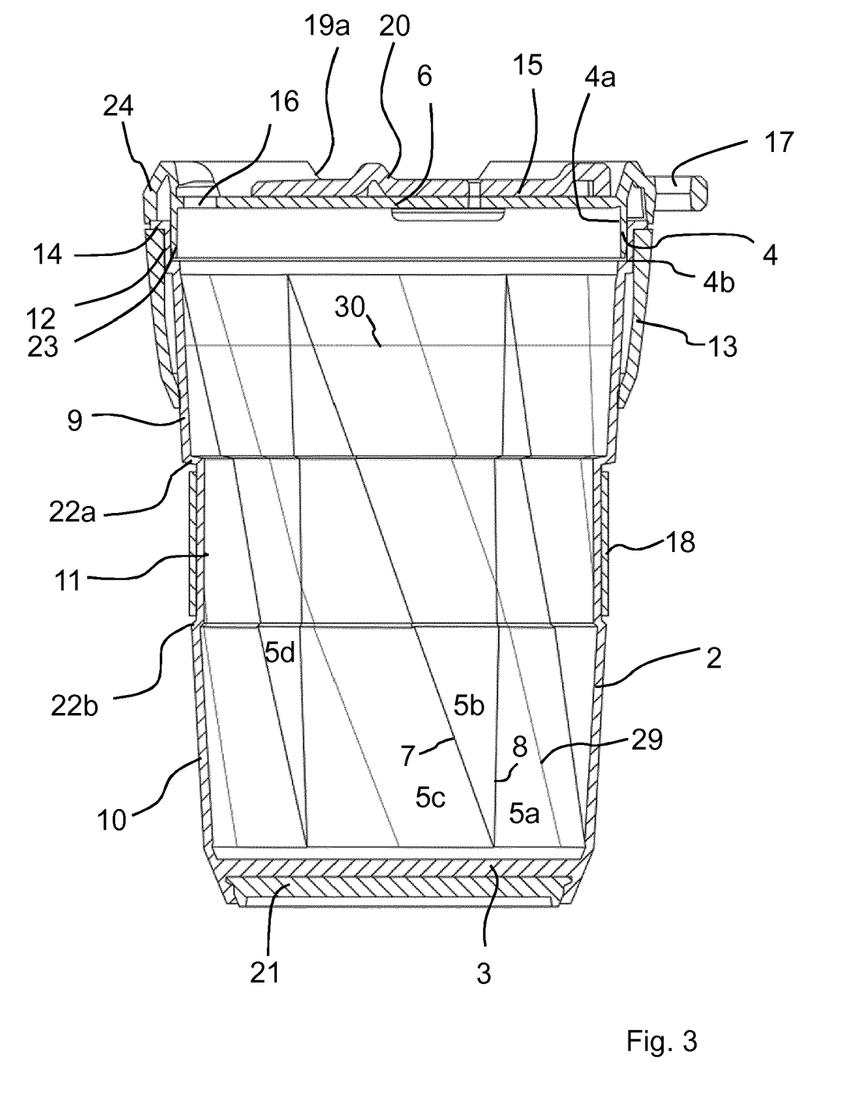
FIG. 3 depicts a sectional view of the sectional plane I-I of FIG. 1.

In FIG. 3, the foldable cup-shaped element 2 can be seen in a sectional view of the sectional plane I-I of FIG. 1. The cup-shaped element has a base part 3, a top part 4 having an opening 4a as well as side wall sections 5a-5d, which are bounded by the first and second fold lines 7 and 8, respectively. The first fold lines 7 are oriented diagonally upward starting from the bottom-side end region, whereas the second fold lines 8 are oriented, starting from the bottom-side end region, essentially straight upward or at least at a smaller angle to the vertical than the first fold line 7. The first and second fold lines 7, 8 can hereby run from a common starting point in the bottom region of the cup-shaped element 2. The respective diagonally running first fold line 7 meets with an adjoining, straight-running fold line 8 in the top part 4 of the cup-shaped element 2. The side wall sections 5a-5d recurring along the circumference as well as the first and second fold lines 7 and 8, respectively, are depicted only once in the drawings for clarity's sake.

The cup-shaped element 2 comprises an upper, frustoconical segment 9 as well as a lower, also frustoconical segment 11. Between the two segments 9, 11, there is a cylindrical segment 10. A circumferential step 22a may be provided between the segment 9 and the segment 10. An additional circumferential step 22b may also be provided between the segment 10 and the segment 11. The holding ring 18 adjoins the region of the cylindrical segment 10.

Figure 6:
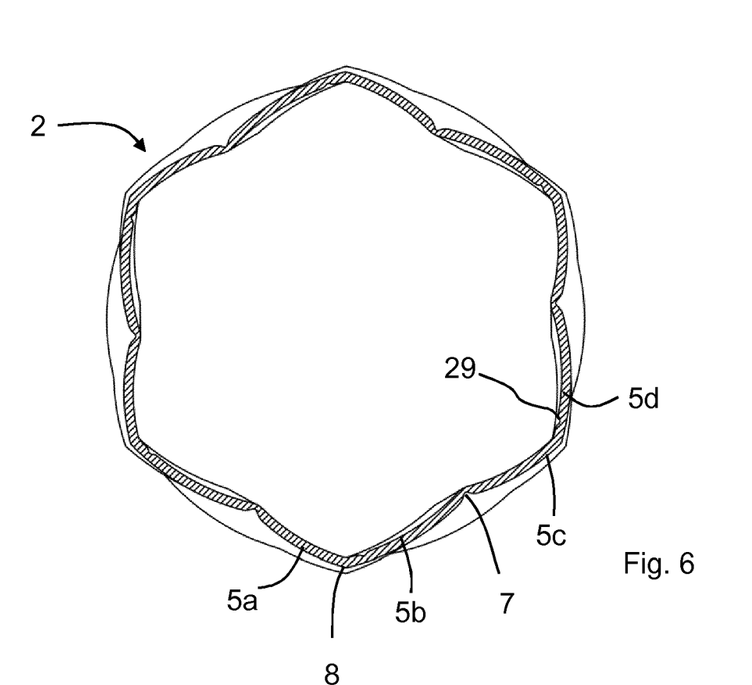
FIG. 6 depicts a sectional view of the cup-shaped element of FIG. 5 in the sectional plane II-II.

In FIG. 3, one can also see, in the unfolded state of the cup-shaped element on the interior side of the cup-shaped element, cf. FIG. 6, third fold lines 29, that formed into it as a material tapering, which are arranged so as to run from the base part diagonally, at an acute angle to perpendicular, preferably also straight, upward to the top side opening. They run in each case laterally, preferably parallel, to the first fold lines 7. By means of the fold lines 29, the folding process is further simplified since the material of the cup-shaped element 2 also folds inward somewhat about these third fold lines 29 when screwing down.

Furthermore, in the unfolded state of the cup-shaped element in the upper region of said element on the interior side of the cup-shaped element, there is arranged in a radially circumferential manner a fourth fold line 30 that is formed into said element. After screwing down, the height of the folded region of the cup-shaped element 2 can be reduced even further by a folding over about this circumferential fourth fold line 30.

The base part 3 of the cup-shaped element 2 also comprises a circular recess into which is placed a bottom insert 21 for stiffening purposes. The material of the bottom insert 21 may have a greater hardness than the material of the cup-shaped element 2.

The cup-shaped element 2 has in the region of its top-side opening 4 a circumferential, radially outward protruding collar 14 that is used as a stop for the sleeve 13 to be pushed on from below. For securing purposes, the lid 6 is pushed on from above on to the upper inner edge of the cup-shaped element 2 so that the upper edge of the cup-shaped element 2 is secured in a clamping manner between the inner wall of the sleeve 13 as so well as the outer wall of a vertically downward projecting circumferential ridge 23 of the lid 6. In addition, the radially outward protruding collar 14 is held in a clamping manner between a downward extending outer ridge 24 of the lid 6 as well as the top front side of the sleeve 13. In the top part 4 of the cup-shaped element 2, there is formed a step 4b, which is used as a stop for the ridge 23. In this way, the lid is secured in a sealing but removable manner to the cup-shaped element 2.

The lid 6 has an attachment eyelet 17, preferably protruding radially outward beyond said lid, which is used to secure the cup, e.g., by means of a snap-hook, to a (non-depicted) backpack or to the body using an attachment strap (also not depicted).

As material of the cup-shaped element 2, there is provided a soft, flexible, deformable plastic or elastic rubber product material, preferably a silicone rubber, a silicone elastic rubber product or a silicone elastomer. In contrast, the material of the lid 6 and/or the sleeve 13 is made of stiffer material, preferably PP or PE.

The first, second, third and/or fourth fold lines are in each case bending grooves formed into the material having a material thickness that is 55 to 75% of the material thickness of the adjacent material in the side region of the cup-shaped element. The material thickness of the cup-shaped element in its folding region adjacent to the fold lines, i.e., in its non-weakened side region between the top part and the base part, lies in a range from 1.00 mm to 1.6 mm.

Figure 4:
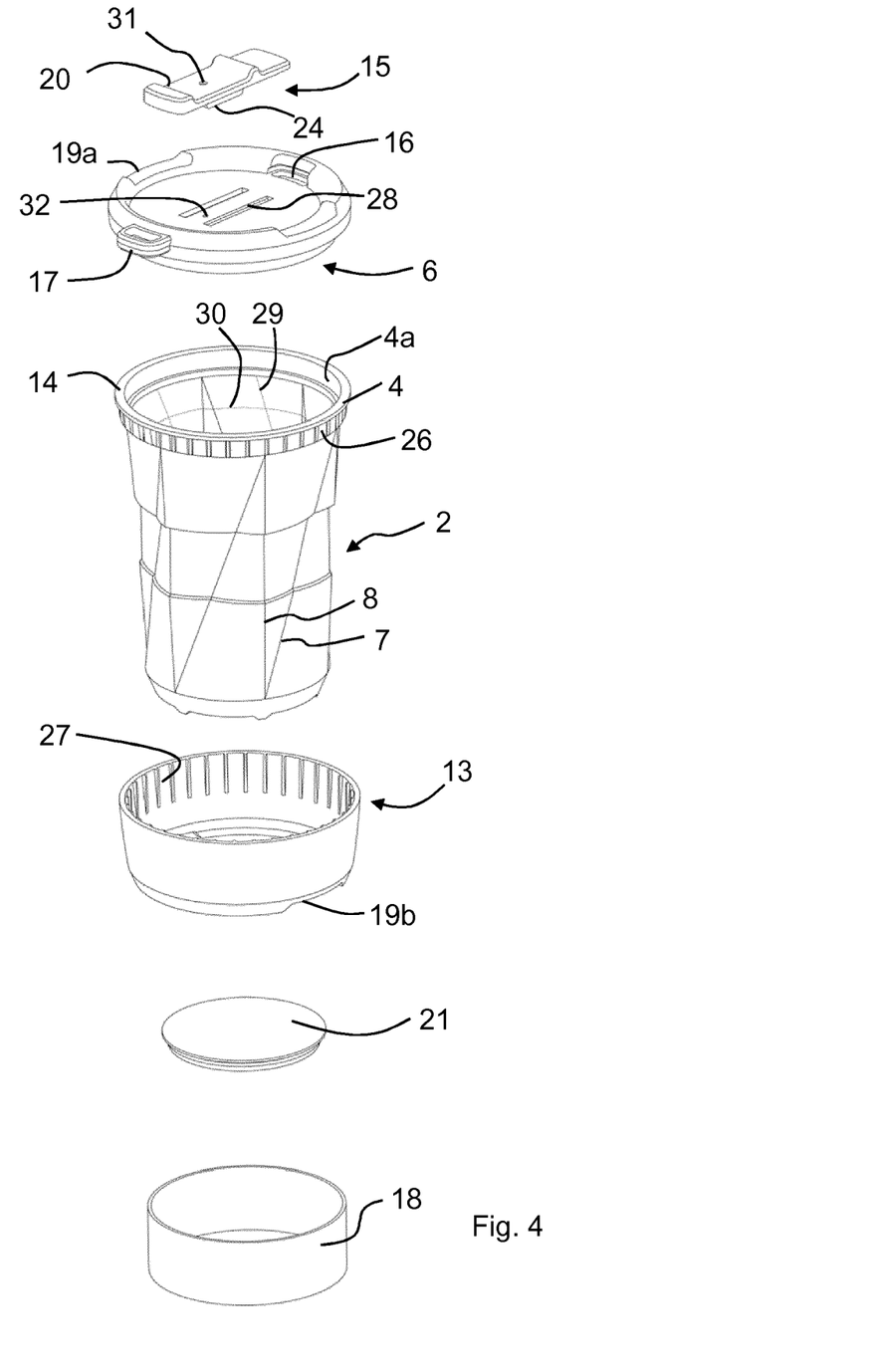

As an exploded view, FIG. 4 depicts the container according to the invention. It comprises a total of six individual parts, specifically the cup-shaped element 2, the sleeve 13, the base part 3, which is snapped into a recess provided on the bottom side of the cup-shaped element 2, the lid 6 as well as the slider 15 attached to the lid 6. The slider 15 has two elongated, parallel-arranged latching crosspieces 24, which engage in a latching manner in two corresponding elongated slits 28 provided on the lid 6, yet allow a linear longitudinal displacement of the slider 15 in relation to the lid 6. Alternatively, the slider 15 can also be secured to the lid 6 by projections being formed on to the top side of the lid 6 (not depicted in the drawings respectively), which engage in a latching manner in a bottom-side recess (also not depicted in the drawings respectively) on the slider 15, and a linear displacement of the slider 6 in relation to the lid 6 is hereby made possible.

The bottom insert 21 can preferably consist of a stiffer material. A necessary stiffness, and thus sturdiness, of the container is hereby achieved.

Figure 5:
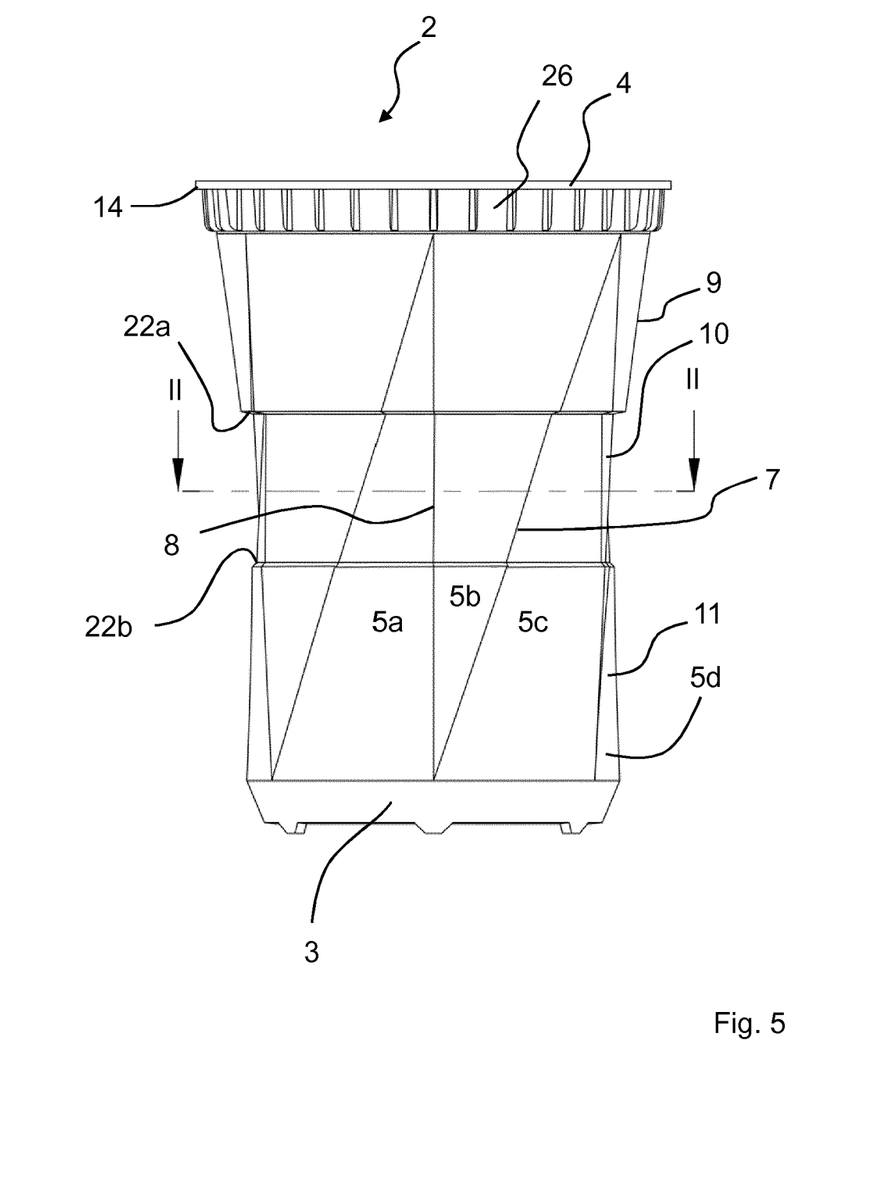
FIG. 5 depicts a side view of the cup-shaped element of the container according to FIG. 1.

FIG. 5 depicts the cup-shaped element 2 of the container 1 according to the invention in a side view. One can see a plurality of variously oriented fold lines 7, 8. The fold lines 7 run diagonally upward at an acute angle to the vertical from the bottom side of the element 3, whereas the fold lines 8 run essentially vertically upward. In the region of the base part 3, the fold lines 7 and 8 begin at a common point, whereas in the top part 4, the diagonally running first fold line 7 converges with the adjacent vertically running second fold line 8. The diagonally running first fold lines 7 are, cf. FIG. 6, formed into the cup-shaped element 2 in such a manner that the side wall sections 5b, 5c adjacent the fold line 7 run inward starting from a circumferential surface and for this reason, they already have a certain angle to each other. When screwing down the base part 3 of the cup-shaped element 2, the adjacent side wall sections 5b, 5c move increasingly toward each other about the fold line 7 acting as a joint.

The fold lines 7 are preferably formed into the material of the cup-shaped element 2 as a line-like material thinning. The material thinning is hereby preferably on the outside, which simplifies cleaning the interior side of the cup-shaped element 2.

The side wall sections 5a, 5b adjacent to the second fold line 8 are by contrast also folded, but in the opposite direction, at a small angle to the fold line 8 as a hinge, which, when twisting the base section 3 of the cup-shaped element 2, results in these two side wall sections also folding on top of each other, yet in the opposite folding direction in relation to the two adjacent side wall sections 5b, 5c.

The special type of folding described above allows the cup-shaped element 2, when held with one's hands at its bottom end, to rotate counter-clockwise for example and hereby to fold or unfold in a simple manner and without a greater exertion of force. The fold lines 7, 8 also ensure a certain stiffness of the cup-shaped element 2 in the unfolded state and also allow simple cleaning of the interior region of the cup-shaped element 2.

The cup-shaped element 2 comprises for example in the embodiment depicted in FIG. 5 three regions, specifically an upper frustoconical segment 9, a lower frustoconical segment 10, as well as a cylindrical segment 11 located in-between. The cylindrical segment 11 is used to receive the holding ring 18, which may be preferably designed in an elastic manner, so that said ring when in use can also be used as a thermally insulating holding sleeve pulled on to the element 2, as shown in FIG. 1.

On the top part 4 of the cup-shaped element 2, below the collar 14, there are arranged vertically running ribs 26, which engage in the corresponding recesses 27, see FIG. 4, on the interior side of the sleeve 13 and further improve the connection between the sleeve 13 and the cup-shaped element 2.

Figure 7:
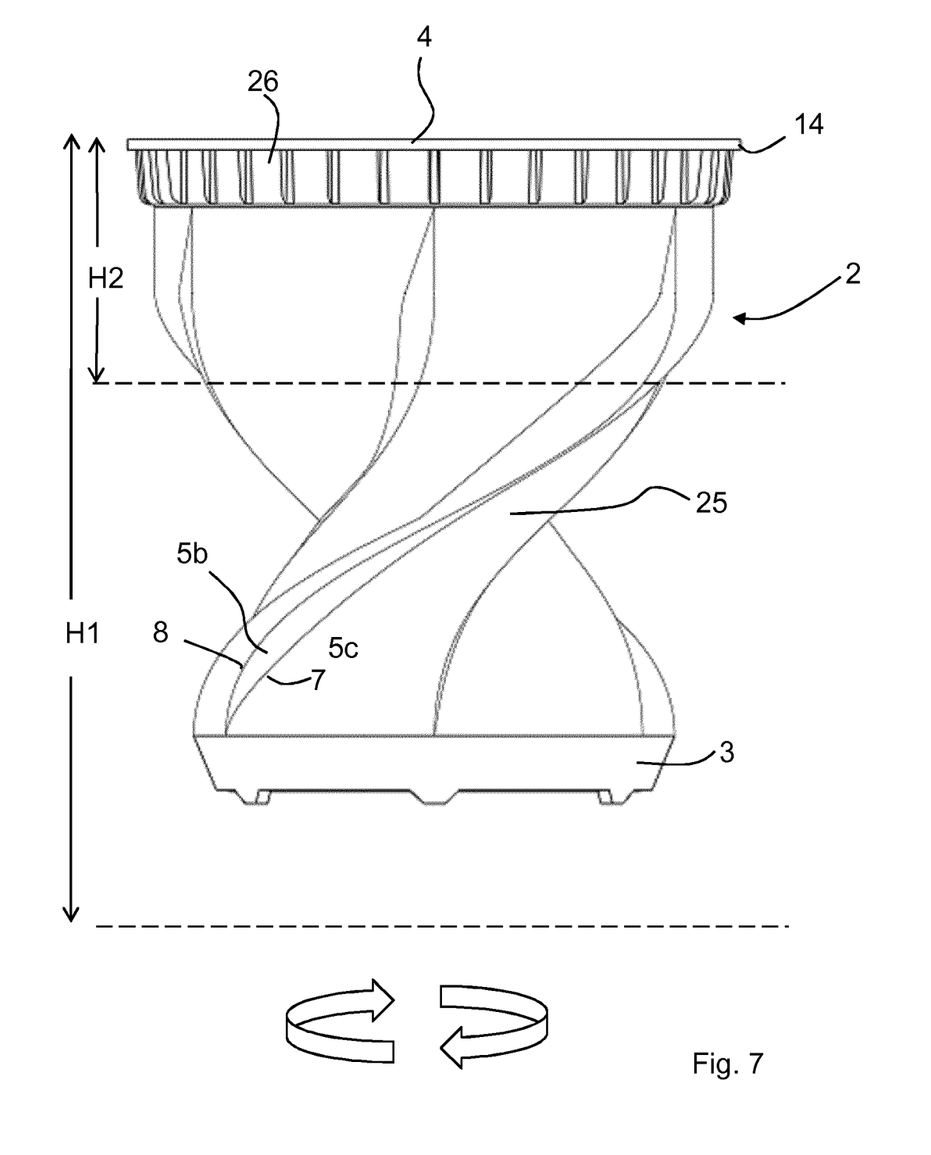
FIG. 7 depicts a side view of the cup-shaped element of the container according to FIG. 1 after initiating the folding process.

For clarity's sake, FIG. 7 shows only the cup-shaped element 2 after the folding process has already begun by turning the base part 3 of said element opposite the clockwise direction relative to the top part 4.

H1 hereby refers to the height of the cup-shaped element 2 in a fully extended, i.e., fully unfolded, state, whereas H2 depicts the height in a fully folded state. The state depicted in FIG. 7 thus represents an intermediate state to demonstrate the type of constriction (28) generated by twisting the base part 3 in relation to the top part 4. The further the base part 3 is turned opposite the clockwise direction, the more the cup-shaped element 2 constricts and the closer the base part 3 and the top part 4 move towards each other.

The course and the arrangement of the fold lines 7, 8 assist this constriction 28.

Figure 8:
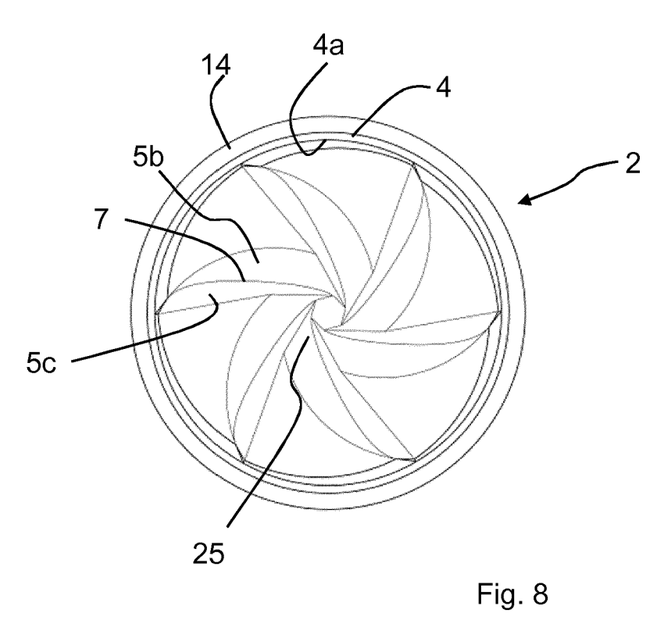
FIG. 8 depicts a top view on to the upper opening of the cup-shaped element when completely folded.

FIG. 8 depicts the cup-shaped element 2 in a completely folded state when viewing the top side opening 4a. One can see that the cup-shaped element has been significantly constricted in the region of the constriction 28 as a result of torsion.

To unfold the cup-shaped element 2, after removing the holding ring 18, cf. FIG. 2, said ring must be gripped with the fingers at base part 3 and turned clockwise as in the embodiment shown in FIGS. 7 and 8, by means of which the cup-shaped element 2 unfolds very smoothly and the constriction 25 decreases and dissipates, respectively, as the turning angle increases so that the cup-shaped element 2 once again has the starting height H1.

The cup-shaped element is designed as one-piece molded part. It comprises in particular no additional formed-in supporting members made of a different material.

The figures in the drawing described earlier relate only to examples of the present invention. Subcombinations of features of the embodiments shown in the figures in the drawing are explicitly covered by the content of the disclosure.

LIST OF REFERENCE SIGNS

1 Container
2 Cup-shaped element
3 Base part
4 Top part
4a Opening
4b Step
5a Side wall section
5b Side wall section
5c Side wall section
5d Side wall section
6 Lid
7 First fold line
8 Second fold line
9 Frustoconical segment
10 Frustoconical segment
11 Cylindrical segment
12 Top-side edge
13 Sleeve
14 Collar
15 Linear slider
16 Edge-side opening
17 Attachment eyelet
18 18 Holding ring
19a Recess 19b Recess
20 Recess
21 Bottom insert
22a Circumferential step
22b Circumferential step
23 Circumferential ridge
24 Latching crosspiece
25 Constriction
26 Rib
27 Depression
28 Elongated slit
29 Third fold line
30 Fourth fold line
31 Vent opening (slider)
32 Vent opening (lid)
H1 Starting height (unfolded) of the cup-shaped element
H2 Height of cup-shaped element in the folded state

The invention claimed is:

1. A collapsible container in the form of a collapsible and re-extendable drinking cup, comprising:
- a cup-shaped element made of flexible, deformable material having a bottom-side base part, a top part having an opening and side wall sections arranged therebetween, and a lid;
- wherein the side wall sections are foldable toward each other along fold lines formed into the material of the cup-shaped element;
- wherein the cup-shaped element is collapsible by twisting the base part to the top part;
- wherein the fold lines are oriented so that the cup-shaped element constricts between the base part and the top part from torsion when twisting the base part;
- wherein in the unfolded state of the cup-shaped element, first fold lines are arranged running from the base part diagonally upward to the top-side opening;
- wherein in the unfolded state of the cup-shaped element, second fold lines are arranged running from the base part at a smaller angle to the perpendicular than the first fold lines or substantially perpendicular upward to the top-side opening;
- wherein the side wall sections adjacent to the first fold lines and to the second fold lines are configured to swivel opposite to each other,
- wherein in the fully unfolded state, the side wall sections adjacent to the first fold lines are oriented inward toward the first fold line, and the side wall sections adjacent to the second fold lines are oriented outward toward the second fold line, wherein an upper region of the cup-shaped element is enclosed by a sleeve and the sleeve is pushed from the underside of the cup-shaped element on to the cup-shaped element.

2. Container according to claim 1, wherein in the unfolded state of the cup-shaped element, the first fold lines extend from the base part diagonally upward to the top-side opening.

3. Container according to claim 2, wherein in the unfolded state of the cup-shaped element, the second fold lines extend from the base part at a smaller angle to perpendicular than the first fold lines or substantially straight upward to the top-side opening.

4. Container according to claim 1, wherein the first and second fold lines have a common starting point proximate the base part.

5. Container according to claim 1, wherein first and second fold lines converge toward each other or end at a common point at the top-side opening and/or at the base part.

6. Container according to claim 1, wherein a wall thickness of the cup-shaped element, on an exterior side, proximate the first fold lines and/or the second fold lines is reduced to a wall thickness of the side wall sections.

7. Container according to claim 1, wherein the cup-shaped element comprises a silicone rubber, a silicone elastomer or silicone elastic rubber product.

8. Container according to claim 1, wherein the lid is provided top-side on the sleeve.

9. Container according to claim 1, wherein a top-side edge and/or a radial, outwardly protruding collar of the cup-shaped element is clamped between the lid and sleeve.

10. Container according to claim 1, wherein the sleeve is configured as a frustoconical-shaped sleeve.

11. Container according to claim 1, wherein the collar is clamped between an upper edge of the sleeve and a lower edge of a downward extending circumferential exterior ridge of the lid.

12. Container according to claim 1, wherein the lid has an edge-side opening closable by a linear slider.

13. Container according to claim 1, comprising an attachment eyelet protruding radially outward.

14. Container according to claim 1, wherein the container in a collapsed state is held together by an elastic holding ring that clasps vertically around the container.

15. Container according to claim 1, wherein in an unfolded state of the cup-shaped element, on an interior side of the cup-shaped element, third fold lines, which are formed into said element, extend from the base part diagonally, straight, upward to the top-side opening.

16. Container according to claim 1, wherein in the unfolded state of the cup-shaped element, in the upper region of said element, on an interior side of the cup-shaped element, a fourth fold line, which is formed into said element, extends radially circumferentially.

17. Container according to claim 1, wherein a top-side edge and/or a radial, outwardly protruding collar of the cup-shaped element is clamped between the lid and sleeve without a detent.

18. Container according to claim 1, wherein an attachment eyelet protrudes radially outward beyond the lid or the sleeve and is provided on the lid or on the sleeve.

* * * * *